United States Patent [19]

Waldner

[11] Patent Number: 4,955,321
[45] Date of Patent: Sep. 11, 1990

[54] COLLECTION TRAY FOR AN ANIMAL FEEDER

[75] Inventor: Joseph A. Waldner, Lauder, Canada

[73] Assignee: J & R Livestock Consultants Ltd., Winnipeg, Canada

[21] Appl. No.: 400,539
[22] Filed: Aug. 30, 1989
[51] Int. Cl.⁵ .............................................. A01K 1/10
[52] U.S. Cl. ..................................................... 119/61
[58] Field of Search ..................... 119/52.2, 57.8, 58, 119/61

[56] References Cited

U.S. PATENT DOCUMENTS

| | | | |
|---|---|---|---|
| 263,876 | 9/1882 | Dunn | 119/58 |
| 1,871,804 | 8/1932 | McGrew | 119/61 |
| 3,253,576 | 5/1966 | Tvedten | 119/61 |
| 4,838,205 | 6/1989 | Larson | 119/52.2 |

Primary Examiner—John Weiss
Assistant Examiner—R. Thomas Price
Attorney, Agent, or Firm—Adrian D. Battison; Stanley G. Ade; Murray E. Thrift

[57] ABSTRACT

The feeding of pigs or other animals is improved by the provision of a tray member which sits underneath the conventional feeder trough and extends out in the front edge of the trough so the material dropped by the animal over the front edge in the feeding action tends to collect on the tray rather than be wasted. The tray has upstanding ribs which define compartments in the area on which the feed falls to maintain the feed in place and to allow feeding of specialized materials.

3 Claims, 2 Drawing Sheets

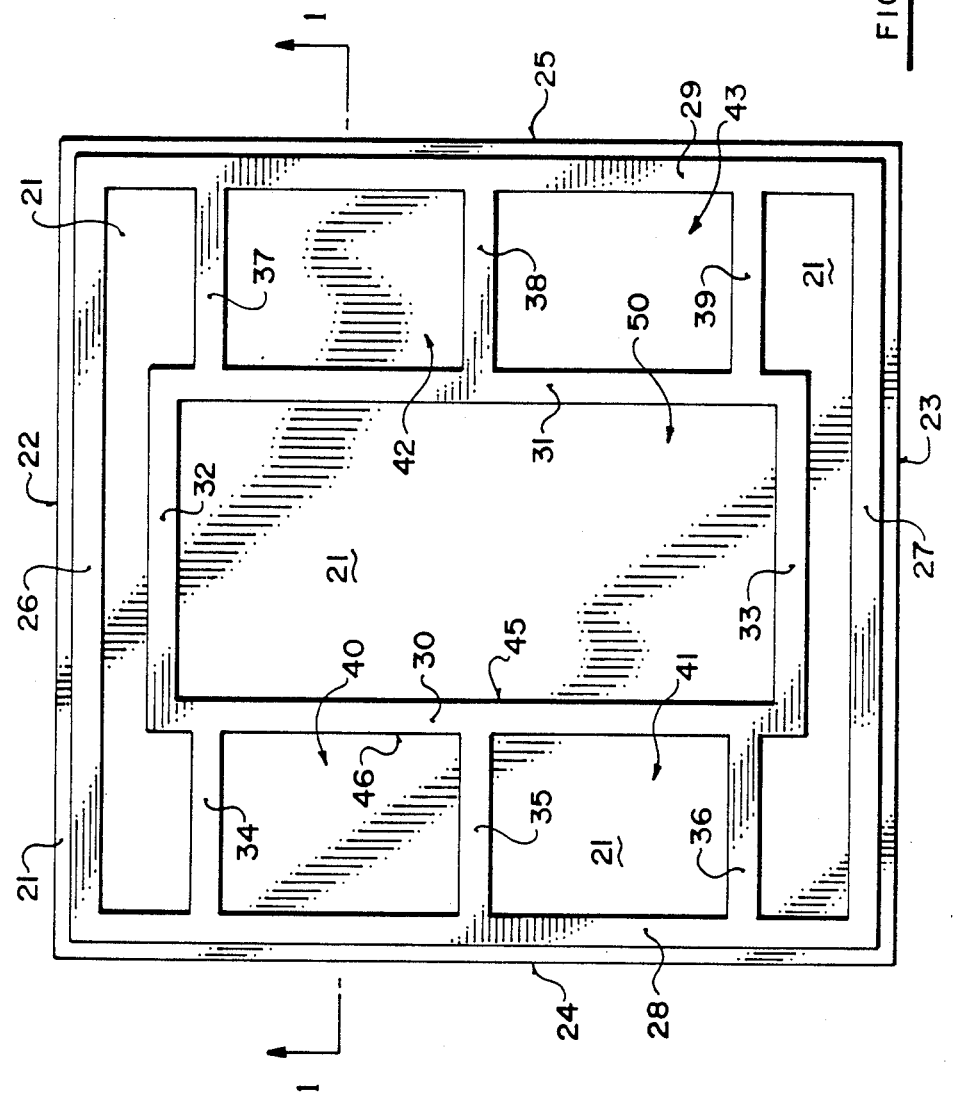

COLLECTION TRAY FOR AN ANIMAL FEEDER

BACKGROUND OF THE INVENTION

This invention relates to a feed system for feeding animals and particularily pigs. Pigs are usually raised in confined quarters in which a feeder is provided with the feeder having a hopper or other device for dispensing feed into the trough. The animal stands on a perforated floor generally defined by parallel slats so waste material from the animal can fall through the slats for collection in a suitable pit beneath the slat.

This system has been well established for many years and various developments have been made in the area of the feeder to improve the supply of feed to the trough, to improve the take up of the feed by the animal and to reduce wasteage of feed by the animal to maximize feed conversion. It is of course an on going objective to yet further improve feed conversion and this constitude the general object of the present invention.

SUMMARY

According to the invention there is provided a feed system for animals comprising a feeder having a trough with a side edge over which the animal reaches for taking feed from a base of the trough and means for supplying feed into the trough, a perforated floor on which the animal stands at the feeder and a longitudinal tray positioned between the feeder and the floor with a portion thereof extending outwardly from said front edge, the tray member having ribs projecting upwardly from an upward surface thereof defining at least one compartment on the tray into which feed dropped by the animal can fall for collection.

The tray therefor provides a device which acts to collect feed dropped by the animal as it steps back from the trough so that the dropped feed remains in compartments in the tray members just in front of the feeder trough. The tray member does not however extend sufficiently to reach the rear end of the animal so any waste material from the animal falls through the slatted floor in conventional manner.

Trials have shown that the waste of feed is significantly reduced and thus the feed conversion rate which is always of paramount importance is improved. In addition trials have shown that the tray member is kept clean by the rooting instincts of the animals.

The compartments in the tray member can also be used to feed specicalized materials to the animal either to assist in weaning the animals or to provide for example specific medication. With the foregoing in view, and other advantages as will become apparent to those skilled in the art to which this invention relates as this specification proceeds, the invention is herein described by reference to the accompanying drawings forming a part thereof which includes a description of the best mode know to the applicant and of the preferred typical embodiment of the principle of the present invention, in which:

DESCRIPTION OF THE DRAWINGS

FIG. 2 is a top plan view of the tray member only of FIG. 1.

DETAILED DESCRIPTION

Figure 1:
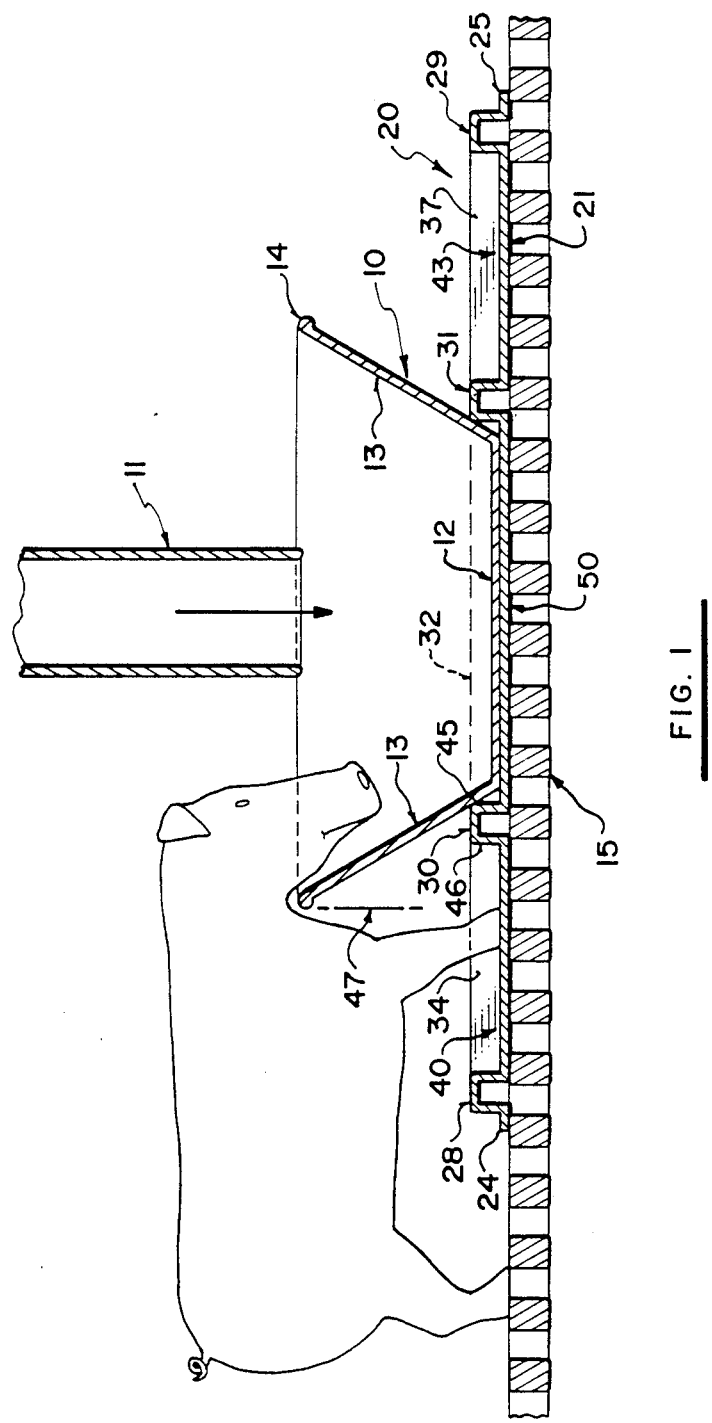
FIG. 1 is a cross sectional view through a feed system taking line 11 of FIG. 2.

The feed system comprises feeder having a trough 10 and dispenser indicated at 11 for dispensing feed in the trough 10. The trough 10 shows in the embodiment shown is a two sided trough so that it can be approached by animals from both the left side and the right side as shown but not from the ends where the feeder has an end wall which prevents animals reaching over the end wall. As view by the pig, therefore, the feed trough has a base of 12 onto which the feed falls together with a front wall 13 with a front edge 14 over which the animal reaches to take feed from the base.

The feeder sits upon a slatted floor indicated at 15 so the animal can stand on the slatted floor and take the feed from the trough with any waste material from the animal being free to escape through the slatted floor for collection. This system is of course entirely conventional and shown schematically. The novel feature according to the present invention includes one provision of the tray member generally indicated at 20. The tray member comprises of vacumm formed generally flat body formed from a flat sheet of suitable plastic material. The vacumm forming defines a plurality of ribs in the flat sheet. As thus shown in FIG. 2, the flat sheet is generally indicated at 21. The sheet is rectangular in shape defining two end edges 22 and 23 and two side edges 24 and 25. Along each of the edges is defined a rib indicated respectively at 26, 27, 28 and 29.

Two side ribs 30 and 31 are provided which lie longitudinally of the sheet paralled to the side edge 28 and 29. Each of the side ribs 30 and 31 lies along one side of the trough and shown in FIG. 1 it is substantially in contact with the front wall of the trough so that the trough is located within the area defined by the side ribs 30 and 31. Ribs 32 and 33 are also provided to confine in a lengthwise direction. Transverse ribs 34, 35 and 36 connect the side ribs 30 to the rib 28. Transverse ribs 37, 38 and 39 connect the side ribs 31 to rib 29. These ribs thus define compartments 40 and 41 one side of the trough and compartments 42 and 43 on the other side of the trough. The structure thus formed is substantially self supportting structure which can rest upon the floor and retain its flat shape with the ribs upstanding from the floor thus defining the compartments.

Referring particularly to the side ribs 30 and 31, it will be noted that a rear edge 45 of the rib 30 lies in contact with the front wall 13 of the trough. A front edge 46 of the rib is positioned rearwadly of a vertical plane indicated at 47 containing the front edge 14 of the trough.

In this way when the animal steps back from the trough with the food in its mouth any food falling from the mouth falls into the compartments 40 and 41 where it is retained for later eating or for eating by other animals. The front edge 46 is however spaced forwardly from the wall 13 so that the animals in a rooting action can reach into the angle between the front edge 46 and the base of the compartment to remove any feed in that area. The width of the rib 30 therefore is governed by the angle of the wall 13 so that if the angle is relatively close to the horiztontal the width of the rib 30 is increased so that the front wall 46 is just behind the vertical plane 47.

The compartments 40 and 41 thus collect any dropped feed material for eating by the pig at a later time or when other pigs come toward the trough they first encounter this feed material and tend to eat from the feed material before they get to the trough. The compartments can also be used to receive medication or other specialized material to be taken by the animal so that the keeper can simply mix up any such medication and drop into the compartments without necessary for any other serving system within the pen.

The central area indicated at 50 of the tray general lies under the base 12 of the trough except in some cases where the trough is welded or permanently fixed in place, the central area 50 can be cut out so that the tray can be inserted by sliding from one end or in portions from opposed sides.

Since various modifications can be made in my invention as herein above described, and many apparently widely different embodiments of same made within the spirit and scope of the claims without departing from such spirit and scope, it is intended that all matters contained in the accompanying specification shall be interpreted as illustrative only and not in a limiting sense.

I claim:

1. A feed system for animals comprising a feeder having a trough including a base wall onto which the feed can rest and a front wall inclined upwardly and forwardly from a front edge of the base wall to a front edge of the front wall over which the animal reaches for taking feed from the base wall of the trough and means for supplying feed into the trough, a perforated floor on which the animal stands at the feeder and a tray member separate from the feeder positioned between the feeder and the floor on which the feeder rests with a portion of the tray member extending outwardly from said front edge of the base all, the tray member having substantially flat horizontal surface for resting on the floor underneath the side edge and a plurality of upstanding ribs projecting upwardly from the flat horizontal surface thereof defining at least one compartment on the tray member into which feed dropped by the animal can fall for collection, the ribs including a first elongate rib arranged so as to extend parallel to the front edge of the base wall of the feed trough with a rear edge of the first rib substantially in contact with the full length of the front wall at a position adjacent the base wall and a front edge of the first rib spaced rearwardly of a vertical plane containing the front edge of the front wall, a second elongate rib along substantially a front edge of the tray member parallel to and spaced from the first rib and a plurality of transverse ribs extending from said second rib to said first rib thus dividing the space between into separate compartments.

2. The invention according to claim 1 wherein a front edge of the tray member projects outwardly from the front edge of longitudinal trough by distance less than the length of the animal.

3. The invention according to claim 1 wherein the front edge of the rib is spaced rearwardly from the vertical plane by distance that such that the animal can reach to the front edge of the rib under the front edge of the trough.

* * * * *